US012339447B2

United States Patent
Omanovic et al.

(10) Patent No.: US 12,339,447 B2
(45) Date of Patent: Jun. 24, 2025

(54) TEMPERATURE VARIABLE HUD MOTOR CONTROL

(71) Applicant: Panasonic Automotive Systems Company of America, division of Panasonic Corporation of North America, Peachtree City, GA (US)

(72) Inventors: Edo Omanovic, Livonia, MI (US); Patrick O'Connell, Novi, MI (US); Prateek Sharma, Peachtree City, GA (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 690 days.

(21) Appl. No.: 17/519,780

(22) Filed: Nov. 5, 2021

(65) Prior Publication Data

US 2022/0155590 A1    May 19, 2022

Related U.S. Application Data

(60) Provisional application No. 63/113,341, filed on Nov. 13, 2020.

(51) Int. Cl.
    *G02B 27/01*     (2006.01)
    *B60R 11/02*     (2006.01)
    *G02B 26/08*     (2006.01)

(52) U.S. Cl.
    CPC ...... *G02B 27/0101* (2013.01); *B60R 11/0229* (2013.01); *G02B 26/0816* (2013.01); *B60R 2300/205* (2013.01)

(58) Field of Classification Search
    CPC ................ G02B 27/01; G02B 27/0101; G02B 27/0149; G02B 27/0172; G02B 26/0816;
(Continued)

(56) References Cited

U.S. PATENT DOCUMENTS

| | | | | |
|---|---|---|---|---|
| 5,043,649 A | * | 8/1991 | Murakami | F16N 29/04 318/473 |
| 2003/0076576 A1 | * | 4/2003 | Neukermans | G02B 6/32 359/290 |

(Continued)

FOREIGN PATENT DOCUMENTS

JP      2019206232 A    *   12/2019   .............. B60K 35/00

*Primary Examiner* — Jyotsna V Dabbi
(74) *Attorney, Agent, or Firm* — Laurence S. Roach, Esq.

(57) ABSTRACT

A heads up display arrangement for a motor vehicle includes a rotatable mirror positioned to reflect a light field produced by a picture generation unit such that the light field is again reflected by a windshield of the motor vehicle and is then visible to a human driver of the motor vehicle as a virtual image. A stepper motor is coupled to the rotatable mirror and rotates the mirror. A stepper motor driver is coupled to the stepper motor and sets a torque of the stepper motor. A temperature sensor detects a temperature associated with the stepper motor. An electronic processor is communicatively coupled to the temperature sensor and to the stepper motor driver. The electronic processor transmits a signal to the stepper motor driver to set a target torque for the stepper motor. The target torque is dependent upon the detected temperature.

9 Claims, 2 Drawing Sheets

(58) Field of Classification Search
CPC .... G02B 2027/0159; G02B 2027/0154; G02B 2027/0163; B60K 35/00; B60K 35/22; B60K 35/53; B60K 2360/23; B60Y 2400/30; B60Y 2400/302
USPC .......................................................... 359/7
See application file for complete search history.

(56) References Cited

U.S. PATENT DOCUMENTS

| | | | |
|---|---|---|---|
| 2018/0017793 A1* | 1/2018 | Sasaki | G02B 27/0149 |
| 2018/0267304 A1* | 9/2018 | Sasaki | G02B 27/0149 |
| 2019/0154439 A1* | 5/2019 | Binder | G01B 11/026 |

* cited by examiner

TEMPERATURE VARIABLE HUD MOTOR CONTROL

CROSS-REFERENCED TO RELATED APPLICATIONS

This application claims benefit of U.S. Provisional Application No. 63/113,341, filed on Nov. 13, 2020, the disclosure of which is hereby incorporated by reference in its entirety for all purposes.

BACKGROUND OF THE INVENTION

1. Field of the Invention

The present invention relates to a heads up display (HUD) of a motor vehicle.

2. Description of the Related Art

A heads up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Automotive validation requires components to be able to operate down to −40° C. Head up displays (HUDs) contain many moving parts which are impacted by temperature change. As temperature decreases below room temperature, the stepper motor inside of the head up display needs to overcome greater resistance in order to move the mirror and function properly.

In cold temperatures head up display performance can be degraded, especially during the initial cold start. The virtual image may be located in an incorrect location due to skipped motor pulses. If enough pulses are skipped, the image may be invisible to the driver entirely.

Currently, if the head up display image is shifted or not visible, then the driver will need to wait a few minutes for the temperature to increase. The driver could then do an ignition cycle to reset the HUD mirror position.

It is possible to have a closed loop system wherein the HUD mirror position is always precisely known. In this type of design, the adjustments could be made until the mirror is in the correct position. These systems are more expensive and not all suppliers utilize closed loop systems.

SUMMARY OF THE INVENTION

The present invention may utilize software as well as hardware to increase the torque of the HUD stepper motor at lower temperatures when mechanical resistances are high. By increasing the torque of the motor at low temperatures through software, the HUD mirror position may always be visible to the driver even at the worst-case cold temperature cold start. As the temperature increases, the torque of the motor may be decreased to accommodate lower resistances.

High torque in stepper motors tends to result in a high level of audible noise. If maximum torque were used at all times, the stepper motor would always be in the correct position but the tradeoff would be a loud audible noise. The invention balances positional accuracy and driver distraction or annoyance by reducing audible noise.

The invention comprises, in one form thereof, a heads up display arrangement for a motor vehicle, including a rotatable mirror positioned to reflect a light field produced by a picture generation unit such that the light field is again reflected by a windshield of the motor vehicle and is then visible to a human driver of the motor vehicle as a virtual image. A stepper motor is coupled to the rotatable mirror and rotates the mirror. A stepper motor driver is coupled to the stepper motor and sets a torque of the stepper motor. A temperature sensor detects a temperature associated with the stepper motor. An electronic processor is communicatively coupled to the temperature sensor and to the stepper motor driver. The electronic processor transmits a signal to the stepper motor driver to set a target torque for the stepper motor. The target torque is dependent upon the detected temperature.

The invention comprises, in another form thereof, a method of operating a head up display in a motor vehicle, including producing a light field. A mirror is positioned to reflect the light field such that the light field is again reflected by a windshield of the motor vehicle and is then visible to a human driver of the motor vehicle as a virtual image. A stepper motor is coupled to the mirror. The mirror is rotated by use of the stepper motor. A temperature associated with the stepper motor is detected. A torque at which the stepper motor operates to rotate the mirror is set. The torque is dependent upon the detected temperature.

The invention comprises, in yet another form thereof, a heads up display arrangement for a motor vehicle, including a rotatable mirror positioned to reflect a light field produced by a picture generation unit such that the light field is again reflected by a windshield of the motor vehicle and is then visible to a human driver of the motor vehicle as a virtual image. A motor is coupled to the rotatable mirror and rotates the mirror. A temperature sensor detects a temperature associated with the stepper motor. An electronic motor controller is communicatively coupled to the motor and to the temperature sensor. The electronic motor controller sets a level of torque at which the motor operates while rotating the mirror. The level of torque is dependent upon the detected temperature.

An advantage of the invention is that it provides a more reliable HUD mirror movement under a wide range of temperature conditions.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
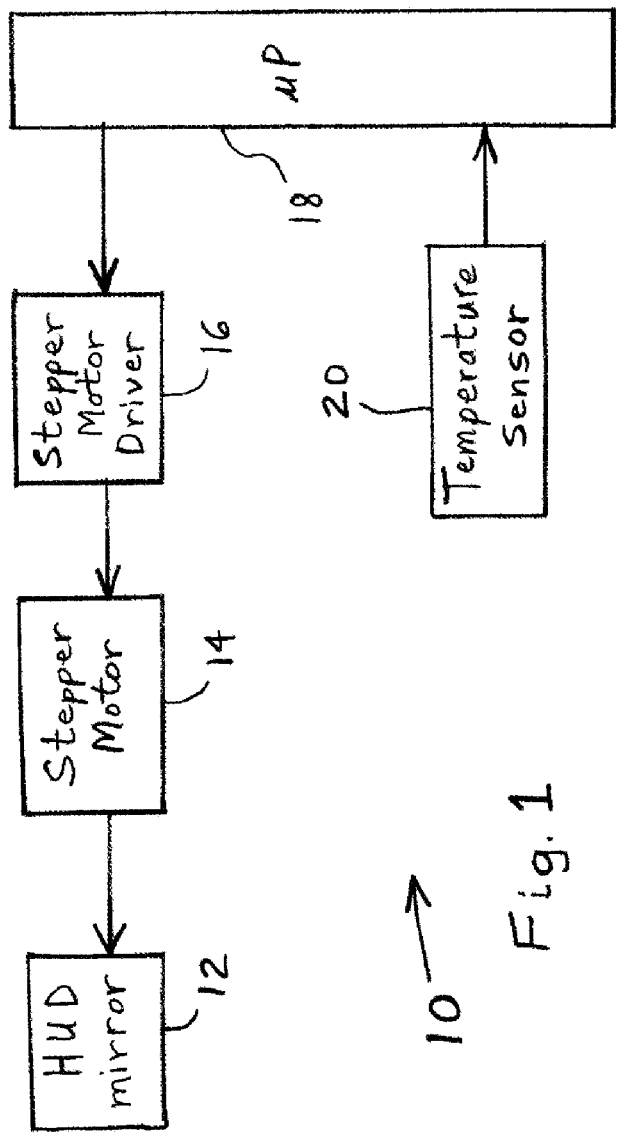
FIG. 1 is a schematic diagram of one embodiment of a head up display arrangement of the present invention.

FIG. 1 illustrates one embodiment of a head up display arrangement 10 of the present invention for temperature variable HUD motor control. Arrangement 10 includes a rotatable HUD mirror 12, an actuator in the form of a stepper motor 14, a stepper motor driver 16, an electronic processor 18 and a temperature sensor 20. Stepper motor driver 16 may include a motor driver integrated circuit (IC) that is capable of setting the torque at which stepper motor 14 operates. Stepper motor driver 16 and electronic processor 18 may be conjunctively referred to herein as a "motor controller". Temperature sensor 20 may be a dedicated temperature sensor, or may a part of another component, such as the liquid crystal display (LCD) of the HUD.

During use, temperature sensor 20 may detect the temperature of stepper motor 14 or of something that may serve as a proxy for the temperature of stepper motor 14. For example, temperature sensor 20 may detect the temperature of ambient air near stepper motor 14, or of an LCD near stepper motor 14. Temperature sensor 20 may transmit a signal indicative of the temperature of stepper motor 14 to processor 18.

After receiving the temperature signal, processor 18 may run software that determines at what target level of torque stepper motor 14 should operate as a function of the detected temperature. For example, if the detected temperature is relatively low, then processor 18 may determine that stepper motor 14 should operate at a relatively high level of torque in order to compensate for the low temperature and high mechanical resistance. Conversely, if the detected temperature is relatively high, then processor 18 may determine that stepper motor 14 should operate at a relatively low level of torque in order to compensate for the high temperature and low mechanical resistance. The torque level as a function of temperature may be determined by any equation, formula or lookup table within the scope of the invention. However, the torque may have a generally inverse relationship with temperature over at least some temperature range. Processor 18 may transmit a signal to stepper motor driver 16 indicating the requested torque of stepper motor 14.

After receiving the torque signal, stepper motor driver 16 may set the requested torque of stepper motor 14. Stepper motor driver 16 may achieve the requested level of torque by adjusting the voltage applied to stepper motor 14, or by adjusting the current drawn by stepper motor 14 by modifying a level of resistance (e.g., by adjusting a potentiometer or variable resistor) that is connected in series with stepper motor 14.

Stepper motor 14 may operate to rotate mirror 12 and change the orientation of mirror 12. The orientation of mirror 12 may determine the reflection angles and directions of a light field produced within the HUD, which in turn may determine the location of the virtual image as seen by the human driver of the motor vehicle. If the light field is not reflected at a proper angle and direction, the virtual image may not be visible at all to the driver.

In an alternative embodiment, the HUD has a torque sensor on the mirror so the software may recognize how much torque is required to move it. The software may then instruct the stepper motor driver to operate the stepper motor at the proper level of torque to rotate the mirror.

Figure 2:
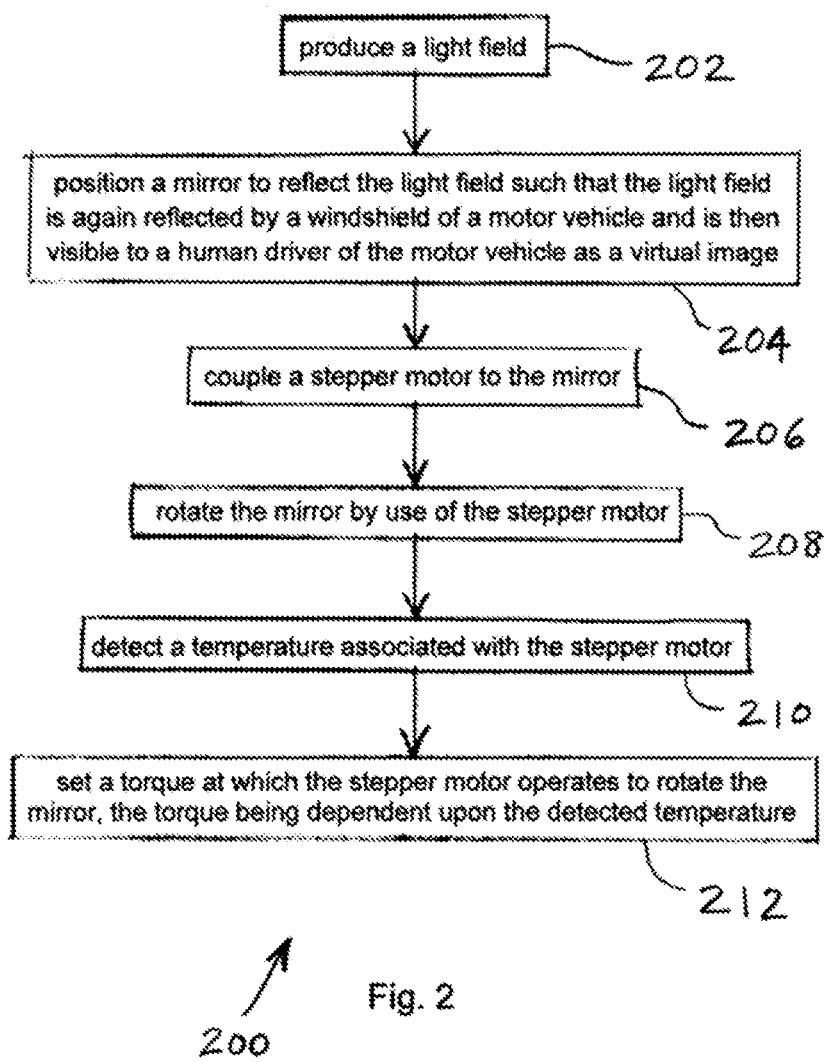
FIG. 2 is a flow chart of one embodiment of a method of the present invention for operating a heads up display in a motor vehicle.

FIG. 2 illustrates one embodiment of a method 200 of the present invention for operating a heads up display in a motor vehicle. In a first step 202, a light field is produced. For example, a heads up display may include a picture generation unit that produces a light field.

Next, in step 204, a mirror is positioned to reflect the light field such that the light field is again reflected by a windshield of the motor vehicle and is then visible to a human driver of the motor vehicle as a virtual image. For example, HUD mirror 14 may be positioned to reflect the light field from the picture generation unit such that the light field is again reflected by a windshield of the motor vehicle and is then visible to a human driver of the motor vehicle as a virtual image.

In a next step 206, a stepper motor is coupled to the mirror. For example, stepper motor 14 may be electrically connected to HUD mirror 12.

In step 208, the mirror is rotated by use of the stepper motor. For example, stepper motor 14 may operate to rotate mirror 12 and change the orientation of mirror 12.

Next, in step 210, a temperature associated with the stepper motor is detected. For example, temperature sensor 20 may detect the temperature of stepper motor 14 or of something that may serve as a proxy for the temperature of stepper motor 14.

In a final step 212, a torque is set at which the stepper motor operates to rotate the mirror. The torque is dependent upon the detected temperature. For example, processor 18 may run software that determines at what target level of torque stepper motor 14 should operate as a function of the detected temperature.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A heads up display arrangement for a motor vehicle, comprising:
 a mirror positioned to reflect a light field produced by a picture generation unit such that the light field is again reflected by a windshield of the motor vehicle and is then visible to a human driver of the motor vehicle as a virtual image;
 a stepper motor coupled to the mirror and configured to rotate the mirror;
 a stepper motor driver coupled to the stepper motor and configured to set a torque of the stepper motor;
 a temperature sensor attached to the stepper motor and configured to detect a temperature associated with the stepper motor; and
 an electronic processor communicatively coupled to the temperature sensor and to the stepper motor driver, the electronic processor being configured to transmit a signal to the stepper motor driver to set a target torque for the stepper motor, the target torque being dependent upon the detected temperature;
 a torque sensor disposed on the mirror and configured to detect a level of torque required to rotate the mirror, the electronic processor being coupled to the torque sensor, the set level of torque being dependent upon the detected level of torque required to rotate the mirror;

wherein the stepper motor driver is configured to set a torque of the stepper motor by adjusting an electrical resistance that is connected in series with the stepper motor.

2. The heads up display arrangement of claim 1, wherein the stepper motor driver is configured to set a torque of the stepper motor by adjusting a voltage applied to the stepper motor.

3. The heads up display arrangement of claim 1, wherein the temperature sensor is configured to detect a temperature of the stepper motor.

4. The heads up display arrangement of claim 1, wherein the target torque has an inverse relationship with the detected temperature.

5. A method of operating a heads up display in a motor vehicle, the method comprising:
producing a light field;
positioning a mirror to reflect the light field such that the light field is again reflected by a windshield of the motor vehicle and is then visible to a human driver of the motor vehicle as a virtual image;
coupling a stepper motor to the mirror;
rotating the mirror by use of the stepper motor;
attaching a temperature sensor to the stepper motor;
using the temperature sensor to detect a temperature associated with the stepper motor; and
setting a torque at which the stepper motor operates to rotate the mirror, the torque being dependent upon the detected temperature;
detecting a level of torque required to rotate the mirror, the step of setting a torque being dependent upon the detected level of torque required to rotate the mirror;
wherein the torque at which the stepper motor operates to rotate the mirror is set by adjusting an electrical resistance that is connected in series with the stepper motor.

6. The method of claim 5, further comprising:
coupling a stepper motor driver to the stepper motor; and
using the stepper motor driver to set the torque for the stepper motor dependent upon the detected temperature.

7. The method of claim 5, wherein the torque at which the stepper motor operates to rotate the mirror is set by adjusting a voltage applied to the stepper motor.

8. The method of claim 5, wherein the detected temperature is of the stepper motor.

9. The method of claim 5, wherein the set torque has an inverse relationship with the detected temperature.

* * * * *